Figure 10:
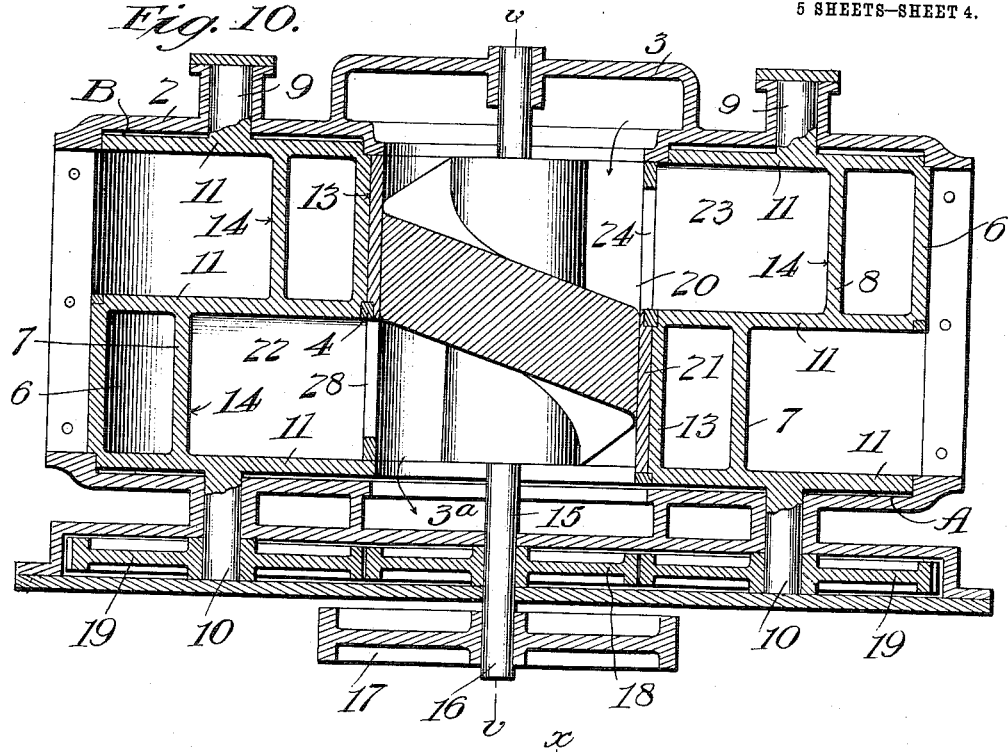

T. W. GREEN.
ROTARY BLOWER AND EXHAUSTER.
APPLICATION FILED JULY 7, 1909.
973,190.
Patented Oct. 18, 1910.
5 SHEETS—SHEET 1.
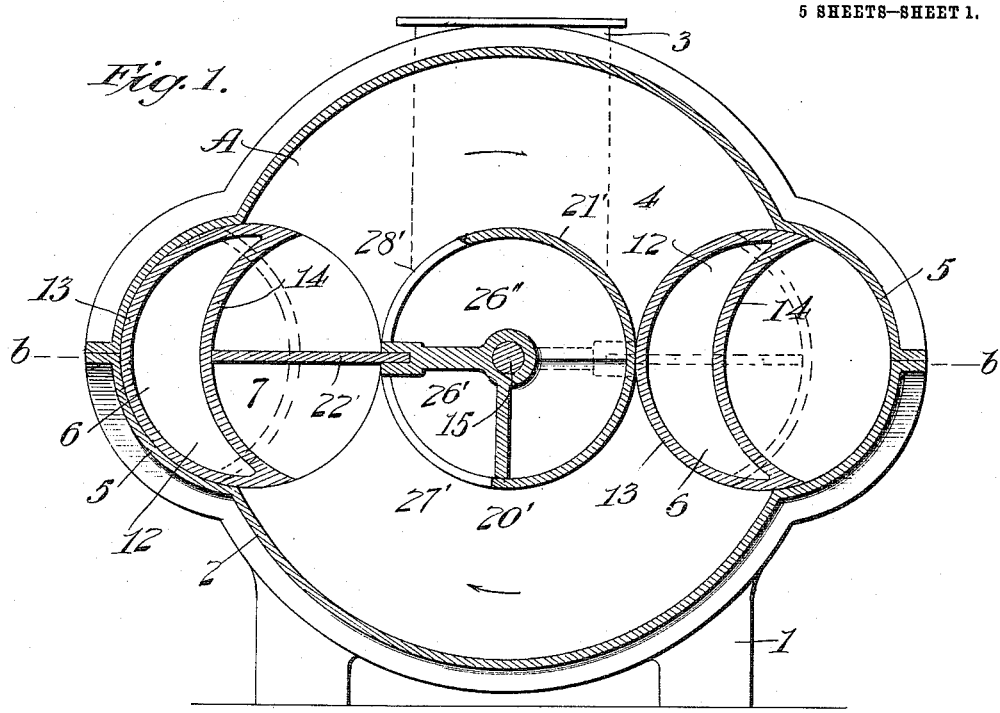
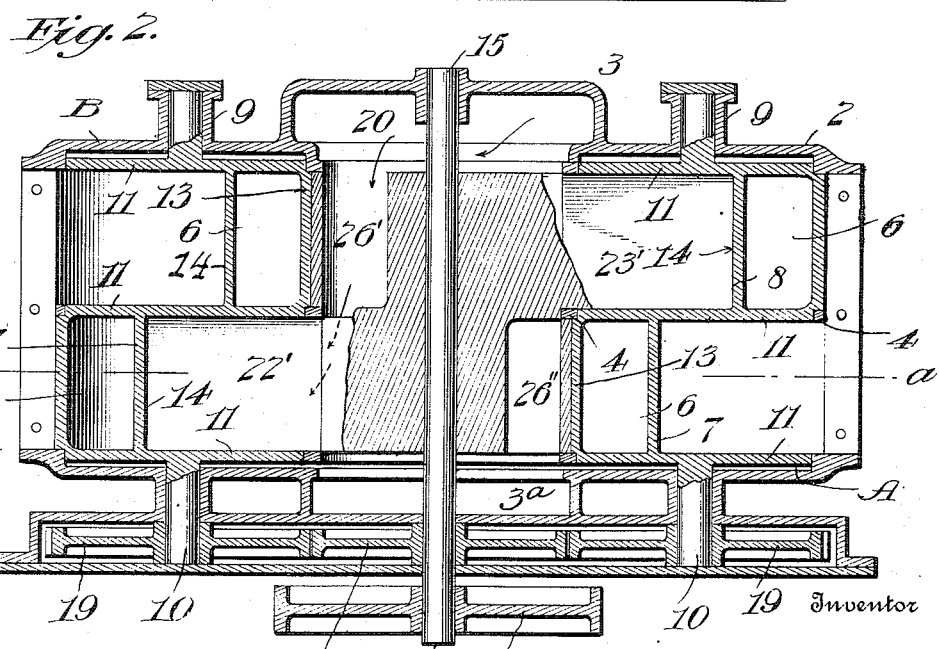

T. W. GREEN.
ROTARY BLOWER AND EXHAUSTER.
APPLICATION FILED JULY 7, 1909.
973,190.
Patented Oct. 18, 1910.
5 SHEETS—SHEET 2.
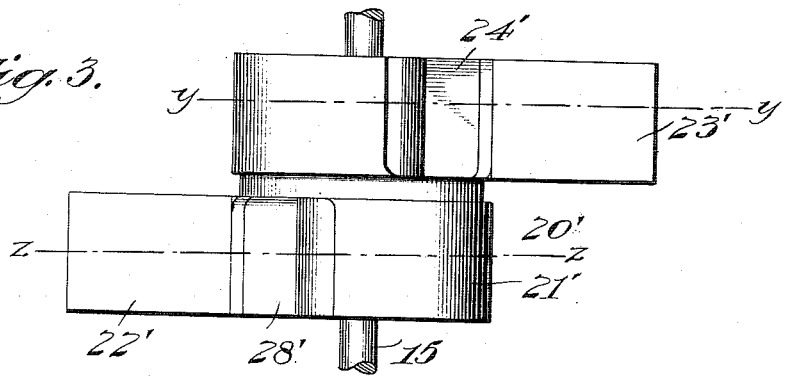
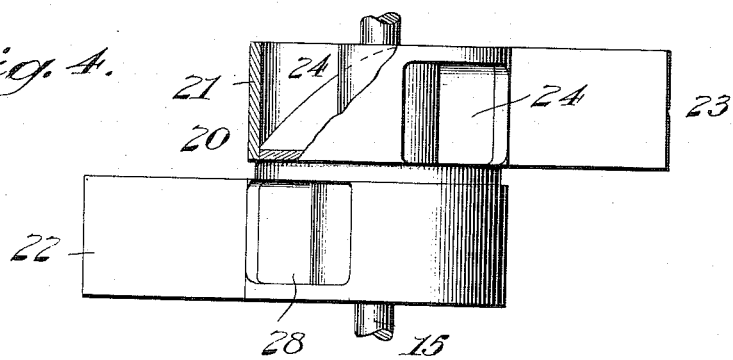
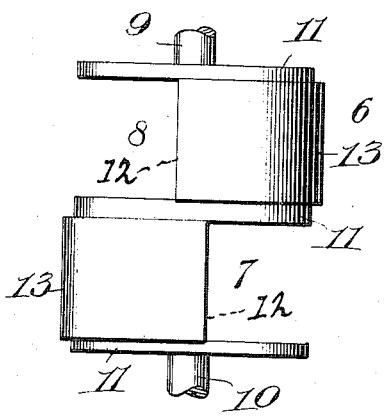
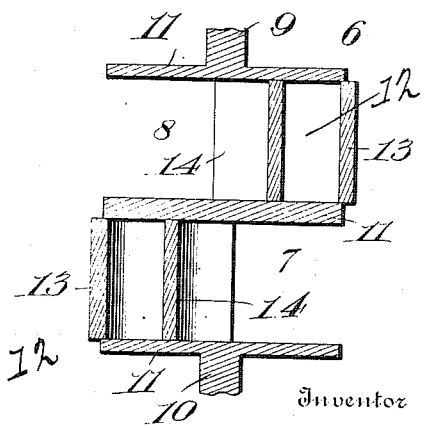
Witnesses
Inventor
Thomas W. Green
By Thos. S. Mowlds
Attorney

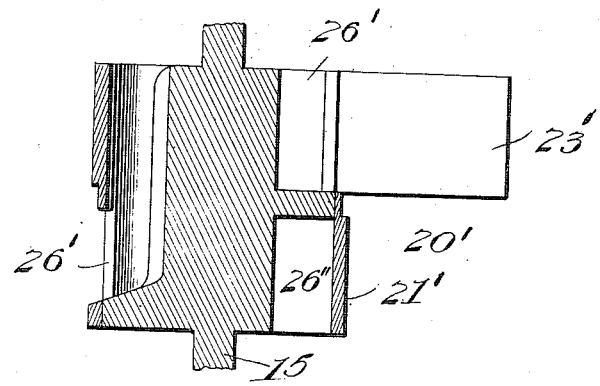
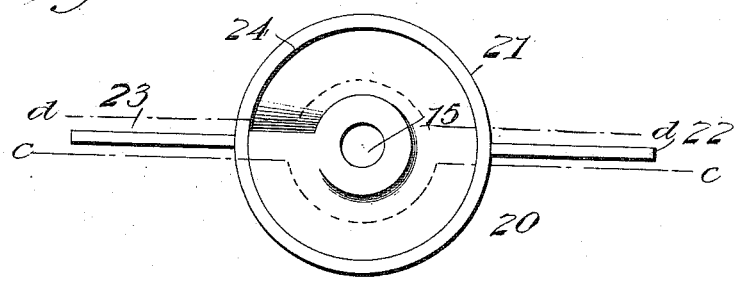
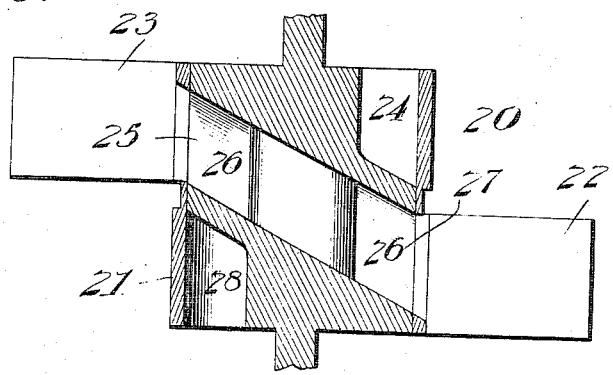

T. W. GREEN.
ROTARY BLOWER AND EXHAUSTER.
APPLICATION FILED JULY 7, 1909.

973,190.

Patented Oct. 18, 1910.
5 SHEETS—SHEET 4.

Witnesses

Inventor
Thomas W. Green
By
Attorney

T. W. GREEN.
ROTARY BLOWER AND EXHAUSTER.
APPLICATION FILED JULY 7, 1909.
973,190.
Patented Oct. 18, 1910.
5 SHEETS—SHEET 5.
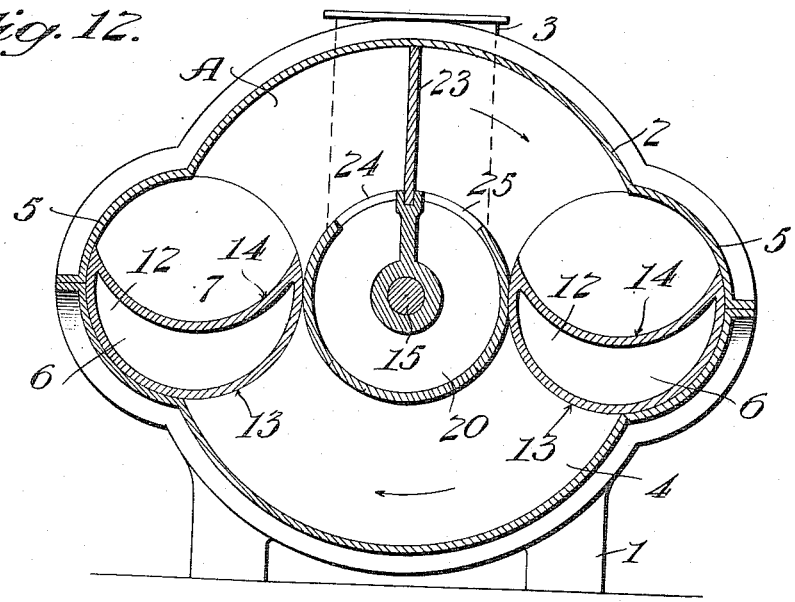
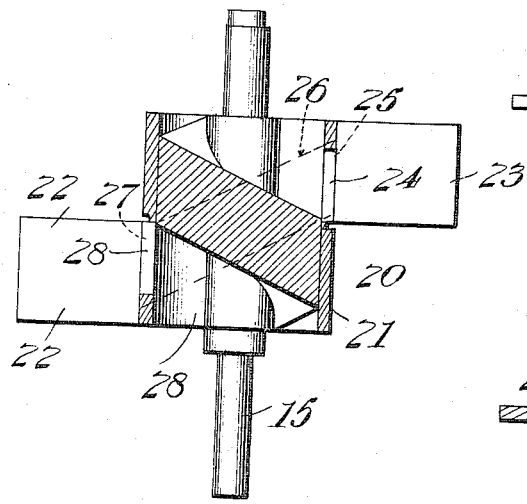
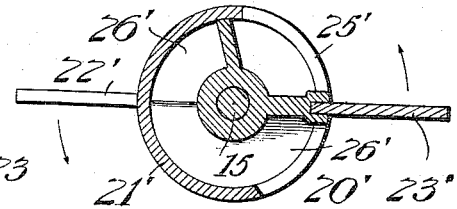
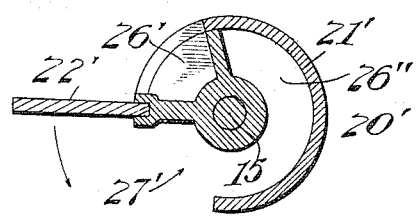
Witnesses
Inventor
Thomas W. Green
By Thomas D. Mowles
Attorney

UNITED STATES PATENT OFFICE.

THOMAS W. GREEN, OF PHILADELPHIA, PENNSYLVANIA.

ROTARY BLOWER AND EXHAUSTER.

973,190.

Specification of Letters Patent. Patented Oct. 18, 1910.

Application filed July 7, 1909. Serial No. 506,372.

*To all whom it may concern:*

Be it known that I, THOMAS W. GREEN, a citizen of the United States, residing in Philadelphia, in the county of Philadelphia and State of Pennsylvania, have invented certain new and useful Improvements in Rotary Blowers and Exhausters, of which the following is a specification.

This invention relates to improvements in rotary pumps or blowers, gas exhausters, etc., and has particular reference to a device wherein the pumping means is formed by three compound co-acting locking members, placed side by side, and is designed as an improvement on the patent granted to me May 30th, 1905, No. 791,147, for rotary blowers and exhausters. In the device shown and described in that patent, the three co-acting locking members and also the wings of the impeller extend in an unbroken line from side to side of the interior of the blower casing. With that construction, the heads at each end had to be weighted on one side to counterbalance the weight of metal in the opposite crescent-shaped portion. This same condition is present in the impeller or central portion carrying the wings, although in a somewhat less degree. As the machines run at a high rate of speed, the counterbalancing requires nice adjustment and adds considerably to the weight of the parts.

The objects of my present invention are to nicely balance all of the revolving parts of the blower, without adding thereto any unnecessary weight, and to increase the pressure at which the fluid acted upon is discharged from the outlet.

Another object of the invention is to provide means whereby an increased amount of fluid may be passed through the device at a low pressure.

To accomplish these results, I divide the side locking members and also the impeller crosswise into two parts or sections, facing in opposite directions (which members, by reason of being composed of oppositely disposed sections, I term "compound,") and place across the inside of the blower casing at the point where the reversed portions meet, a closed partition or wall that divides each of the co-acting parts of the blower and the surrounding case into two parts, thus making practically a double blower, with the corresponding parts of the same size. To increase the pressure, I construct the impeller with two compartments, one communicating with the intake and the other with the discharge of the blower, communication between the two compartments being established through channels in the impeller. The fluid to be acted on passes into the first compartment where it is compressed slightly, and is then passed along to the second compartment, where it is still further compressed before being finally discharged from the blower.

Figure 11:
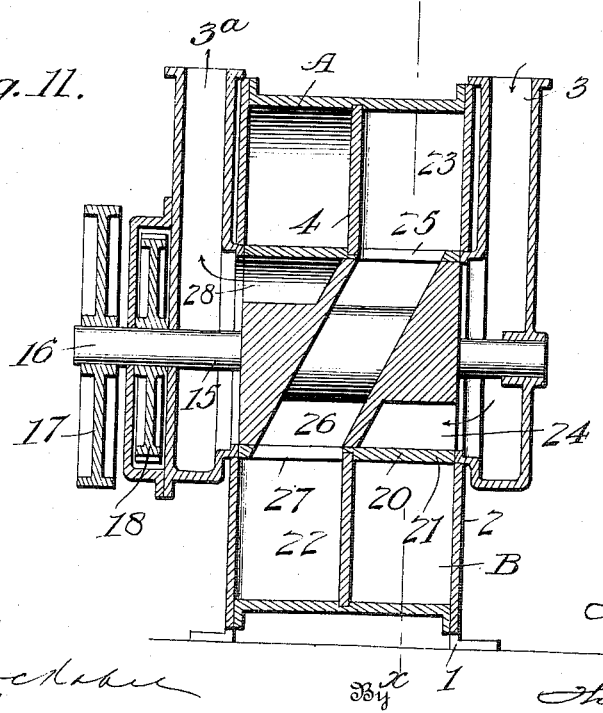

In the drawings:—Figure 1 is a transverse vertical section on line $a-a$ of Fig. 2, showing the three locking members in one chamber (chamber A), in full lines, and indicating the three locking members in the other chamber (chamber B), in dotted lines. Fig. 2 is a horizontal section taken on line $b-b$ of Fig. 1, showing the interior arrangement of the device, and the relative positions of the locking members therein. Fig. 3 is a view of a modified form of the impeller or central locking member, shown in Figs. 1, 2, 7, 14, and 15. Fig. 4 is a view of the preferred form of impeller shown in Figs. 8, 9, 10, 11, 12, and 13, with a part of the upper portion broken away to show the internal construction. Fig. 5 is a top view of one of the side locking members in the position shown in Figs. 2 and 10. Fig. 6 is a central horizontal sectional view of the side locking member. Fig. 7 is a cross-sectional view of a modified form of the impeller, one of the blades being omitted to show the channel extending therethrough. Fig. 8 is an end elevation of the preferred form of impeller or central locking member shown in Figs. 4, 9, 10, 11, 12, and 13. Fig. 9 is a horizontal sectional view of the impeller taken on line $c-c$ of Fig. 8; showing the channel extending therethrough from the forward side of the blade in one chamber to the rear side of the blade in the adjoining chamber, and also the spirally shaped openings for establishing communication between the intake and the chamber adjacent thereto, and the outlet and the adjacent chamber. Fig. 10 is a horizontal sectional view of the device similar to Fig. 2, with the exception that the impeller or central locking member shown therein is of the preferred form, the impeller shown in Fig. 2 being a modified form. Fig. 11 is a vertical cross-sectional view taken on line v—v of Fig. 10, showing the channel connecting the two chambers extending from the forward side of blade 23, to the rear side of blade 22. Fig. 12 is a vertical transverse sectional view of the device taken on line x—x of Fig. 11. Fig. 13 is a horizontal sectional view of the impeller taken on line d—d of Fig. 8, showing in full lines the spiral openings adapted to connect one chamber with the intake and the other chamber with the outlet, and showing in dotted lines the channel connecting the two chambers. Fig. 14 is a vertical sectional view of the modified form of impeller, taken on line y—y of Fig. 3, and Fig. 15 is a similar view taken on line z—z of Fig. 3.

Referring to the drawings, the numeral 1 indicates the base upon which is mounted the casing or shell 2, of the rotary pump or blower.

The numeral 3 indicates the intake which is located at the forward end of the blower casing, the outlet 3ᵃ being similar in construction and located at the opposite or rear end of the blower casing as shown.

The numeral 4 indicates a partition or wall, dividing the interior of the casing into two separate chambers, A and B. This partition 4 fits snugly around the central impeller and co-acting side locking members, making a close fit and preventing any of the fluid acted upon from passing forward except through the channel in the central part of the impeller.

The numeral 5 indicates segmental off-sets in the sides of the casing, extending the length thereof, as shown. In each of these off-sets 5, in the sides of the casing, is mounted a rotatable compound locking member 6, as shown in Figs. 1, 2, 10, and 12, for purposes hereinafter stated. It will be observed that each of these rotatable side locking members 6, is composed of two separate and oppositely disposed locks 7 and 8, and which are arranged side by side, as shown in Figs. 2, 5, 6 and 10. One of these locks, 7, is adapted to set and operate in the chamber A, and the other, 8, is adapted to set and operate in the chamber B, as shown in Figs. 2 and 10. These side locking members are journaled on shafts 9, 9, and 10, 10, in suitable bearings on the ends of the casing 2. The side locking members 6 are each composed of three circular heads 11, 11, 11, connected by intervening crescent-shape web portions 12, 12, as shown in Figs. 5 and 6.

The outer surface 13 of the crescent-shape portion 12, has the same curve as the segmental extension 5, into which it snugly fits, and the inner surface 14, is made on an arc greater than the outer surface 13, for a purpose hereinafter stated.

The numeral 15 indicates the main driving shaft, journaled in suitable bearings in the ends of the casing 2, centrally thereof, as shown. On the end 16, of the shaft 15, outside of the casing 2, is a driving pulley 17. Inside of the pulley 17, on the shaft 15, is a cog-wheel 18, adapted to mesh with corresponding cog-wheels, 19, 19, on the ends of the shafts 10, 10, carrying the side locking members 6. Rigidly secured to the driving shafts 15, is an impeller 20, consisting of a cylindrical portion 21, the diameter of which is the same as the diameter of each of the side locking members 6. Secured to this cylinder, at diametrically opposite sides thereof, are impeller blades 22, 23. Each of these impeller blades is made to fit snugly in the chamber in which it is working, and the width of each of said blades is the same as the distance between the circular heads 11 of the members 6, with which it co-acts, and said blades are of such length as to sweep the inner locking surfaces 14, of the side locking members 6, and the inner circular surface of the casing 2, in the chamber in which they are operated, to form a lock, as is apparent. While the impeller blades are secured to the opposite sides of the cylinder 21, it will be noticed that one, 22, is secured to the left-hand side and works in the chamber A; while the other, 23, is secured on the right-hand side thereof, in such position as to operate in the chamber B. The distance between the adjacent edges of said blades is equal to the thickness of the partition 4, and the same as the thickness of the heads 11 that divide each of the locking members 6 into two compartments. Adjacent to each side of each of the impeller blades is an opening or passage, as shown.

The numeral 24 indicates the opening at the rear side of the blade 23 which extends spirally to and communicates with the intake 3 of the blower.

The numeral 25 indicates an opening to the forward side of the blade 23 which communicates through a channel 26 with the opening 27 at the rear side of the blade 22, whereby communication between the two chambers A and B is established.

28 indicates the opening to the forward side of the blade 22 and extends spirally to and communicates with the outlet or discharge 3ᵃ of the blower, as is evident.

The partition 4, between the chambers A and B, is preferably made in sections, so that it may be more easily adjusted to fit around the locking members and around the central part of the impeller.

In Figs. 3, 7, 14 and 15 I have illustrated a modified form of impeller to be used when volume is desired, and no high pressure is required. In this impeller, it will be noticed, that the channel in the rear of the impeller blade connects directly with both the discharge and the intake sides of the blower, and comparatively little compression takes place in the compartments A and B.

The numeral 20' indicates the impeller mounted on the shaft 15, and comprises a cylindrical portion 21' and two impeller blades 22' and 23'.

The numeral 26' indicates a channel extending through the cylinder 21' from the intake side of the blower, back of the blade 23' toward the outlet side of the blower to the rear side of the impeller blade 22' in the next chamber, and 25' is an opening to the forward side of blade 23' and 27' is a similar opening to the forward side of blade 22', and 26'' is a channel connecting such openings.

The blower being started in the direction indicated by the arrow in Figs. 1 and 12, the movement of the impeller blade 23 will force all of the air in advance of said blade in the chamber B through the opening 25 and channel 26 into the chamber A or the opposite end of the blower and out through the discharge 3$^a$. The forward movement of the impeller blade, that forces the air through the channel 26, will create a vacuum in the chamber at the rear of said blade, and cause the air to rush in from the outside atmosphere, thus filling all unoccupied space in the forward part of the blower. The air coming in at the rear of the impeller blade 23 is locked in and cannot get out, except through the opening 25 to the forward side of the blade 23, and the channel 26, that leads to the discharge side of the blower. The air is continuously sucked in and forced forward in a steady stream and as it enters the second chamber in a compressed condition, it will be further compressed in its passage through the said chamber.

The operation of the blower is the same, whether the form of the impeller shown in Figs. 1, 2, 3, 7, 14, and 15, is used, or the preferred form shown in Figs. 4, 8, 9, 10, 11, 12, and 13; the only difference is that when the preferred form shown in Figs. 4, 8, 9, 10, 11, 12 and 13, is used, all of the fluid acted upon must first go through the chamber B, passing into the chamber A in a compressed condition, while with the form of impeller shown in Figs. 1, 2, 3, 7, 14 and 15, the fluid passes from the outside atmosphere directly into both chambers, and an increased volume at lower pressure is discharged at the outlet of the blower.

If desired the co-acting parts of the blower may be further compounded and instead of being divided into two sections, as shown, there may be three or more, and an increased pressure thus obtained.

It will be apparent that, by reason of the construction of the impeller or central locking member, the several parts thereof will practically balance one another during the rotation of such impeller. It will also be evident from the formation of the side locking member 6 that these locking members will, practically, be balanced during rotation, as a heavy portion of one section will be in line with a lighter portion of the same section and on opposite sides of its shaft. It will also be noted that this balanced condition of all the locking members is uniformly maintained by reason of these members being so geared that their relative positions cannot be changed during operation.

Having thus described my invention, what I claim as new and desire to secure by Letters Patent of the United States is:—

1. A rotary pump or blower having therein two crescent shape side locking members and an impeller located between said crescent shape side locking members and co-acting therewith; both of said crescent shape side locking members and also the impeller being divided cross-wise into sections and the parts connected together in such position, that the heavy portion of one section will lie in a direct line with and adjacent to the lighter portion of the other section of the same member.

2. A rotary pump or blower having therein two compound side locking members and an impeller located between said side locking members and co-acting therewith; the impeller being provided with a suitable port or channel that forms a communication between the intake and discharge of the blower, the crescent shape locking members and the impeller being divided cross-wise and the parts connected in reversed positions, so that the weight of each member will be evenly distributed on opposite sides of the respective driving shafts.

3. In a rotary blower, the combination of the two compound rotary side locking members 6, the impeller 20 located between said side locking members, and co-acting therewith, and having wings on opposite sides and at opposite ends thereof and the casing 2, surrounding the impeller and side locking members, and having therein the separate chambers, A and B.

4. In a rotary blower, the combination of two compound side-locking members and a co-acting impeller located between said side-locking members, the central portion of said impeller having therein a passage-way, the forward part of which communicates with the intake and the rear portion with the discharge of the blower.

5. In a rotary blower, the combination of two compound rotary side locking members and a co-acting impeller located between said side locking members, the central portion of said impeller having therein two channels, both of which communicate with the inlet side of the blower.

In testimony whereof I affix my signature, in presence of two witnesses.

THOMAS W. GREEN.

Witnesses:
S. I. HARPER,
THOS. D. MOULDS.